US006981092B2

(12) United States Patent
Piepho

(10) Patent No.: US 6,981,092 B2
(45) Date of Patent: Dec. 27, 2005

(54) AUTOMATIC MEDIA READYING SYSTEM AND METHOD

(75) Inventor: Allen J. Piepho, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 263 days.

(21) Appl. No.: 10/284,673

(22) Filed: Oct. 31, 2002

(65) Prior Publication Data

US 2004/0088500 A1 May 6, 2004

(51) Int. Cl.[7] ............... G11C 12/00; G11B 20/12; G11B 5/09
(52) U.S. Cl. .................... 711/111; 360/44.26
(58) Field of Search .............. 711/111; 369/59.25, 369/53.1; 360/44.26

(56) References Cited

U.S. PATENT DOCUMENTS 6,791,928 B2 * 9/2004 Su et al. .............. 369/59.25

* cited by examiner

Primary Examiner—Jack Lane

(57) ABSTRACT

One aspect of the invention is a method for automatically readying a medium. The method comprises monitoring a state of a storage medium using readying logic and determining a physical media type for the storage medium using the readying logic. The method also comprises determining a recorded type for the storage medium using the readying logic and selecting, using the readying logic, a file system type for the storage medium if the storage medium is formatted using a file system. The method further comprises automatically readying the storage medium in response to the determinations and selection.

24 Claims, 2 Drawing Sheets

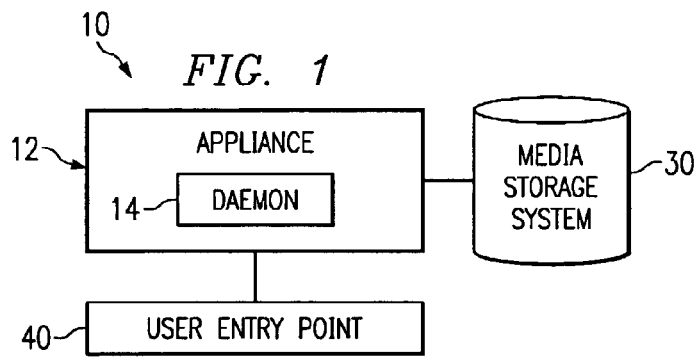
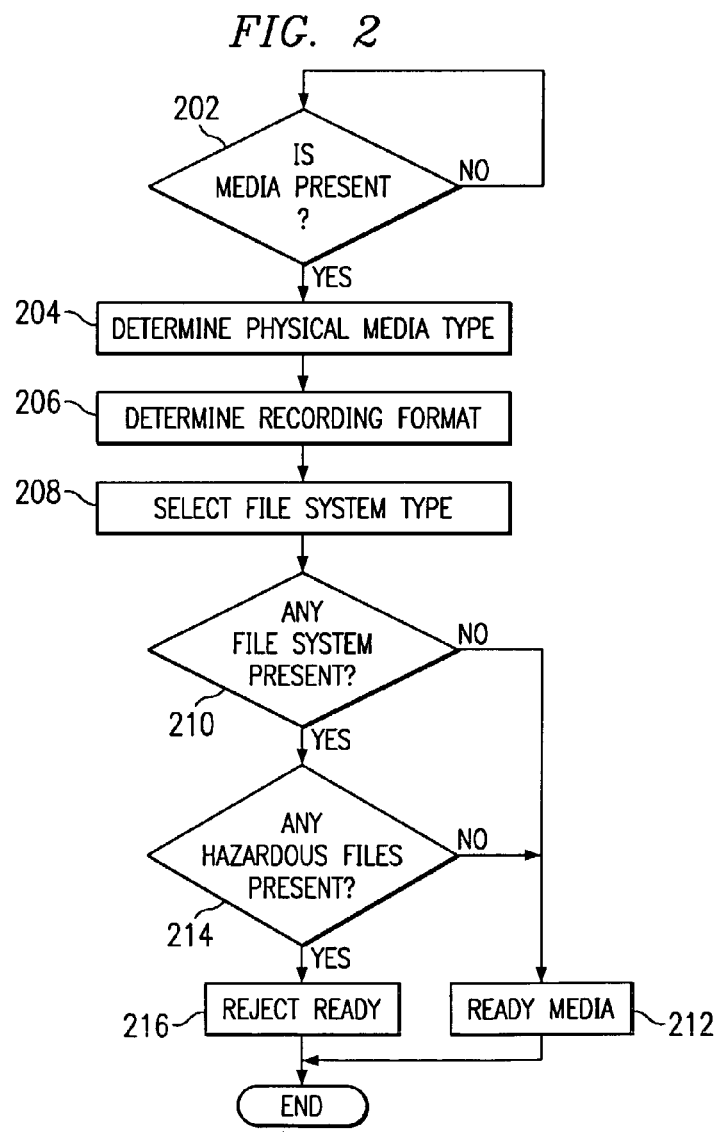

AUTOMATIC MEDIA READYING SYSTEM AND METHOD

TECHNICAL FIELD OF THE INVENTION

The present invention relates in general to computer systems and, more particularly, to automatic media readying.

BACKGROUND OF THE INVENTION

Today's computing networks employ many types of complex technology. For example, consumers using a variety of client computers such as personal computers (PCs), may communicate virtually seamlessly with a variety of other clients and server computers that may be hosting the same or different operating systems (OSs). These complex technologies also include a proliferation of storage media type, e.g., optical storage media such as Digital Versatile Discs (DVDs), Compact Discs (CDs) and digital video (CDs).

Unfortunately, with the proliferation of various media and other technologies, a consumer may easily be overwhelmed with all of the options required to properly configure a system according to the consumer's need. For example, when readying media such as a CD for access by a processing element such as a computer, many conventional systems and methods blindly attempt to mount a default file system type. If this default file system type is not found on the disk, these systems and methods typically fail. Other systems may be unable to ready media with dual file systems such as Universal Disc Format (UDF)/ISO 9660. Moreover, because the consumer may select among a variety of discs to mount, a conventional system utilizing a default file system or one that may not read a dual file system typically requires additional time that could be otherwise allocated to more productive tasks. Moreover, user intervention may also be required. Finally, most conventional systems and methods do not monitor for the existence of hazardous files, usually disruptive and/or destructive, that may be used, for example, to launch rogue programs from the mounted discs. Once launched, the rogue program may destroy or modify files on the system.

SUMMARY OF THE INVENTION

One aspect of the invention is a method for automatically readying a medium. The method comprises monitoring a state of a storage medium using readying logic and determining a physical media type for the storage medium using the readying logic. The method also comprises determining a recorded type for the storage medium using the readying logic and selecting, using the readying logic, a file system type for the storage medium if the storage medium is formatted using a file system. The method further comprises automatically readying the storage medium in response to the determinations and selection.

Another aspect of the invention is a system for automatically readying a medium. The system comprises a media storage system operable to interface with a storage medium, an appliance communicatively coupled to the media storage system, and application logic operatively associated with the appliance. The application logic is operable to monitor a state of the storage medium and to determine a physical media type for the storage medium. The application logic is also operable to determine a recorded type for the storage medium, select a file system type for the storage medium if the storage medium is formatted using a file system, and to automatically ready the storage medium in response to the determinations and selection.

Yet another aspect of the invention is an automatic media readying application. The application comprises a computer-readable storage medium and an automatic readying application resident on the computer-readable storage medium. The readying application is operable to monitor a state of a storage medium and to determine a physical media type for the storage medium. The readying application is also operable to determine a recorded type for the storage medium, select a file system type for the storage medium if the storage medium is formatted using a file system, and to automatically ready the storage medium in response to the determinations and selection.

Another embodiment of the present invention is a system for automatically readying a medium, which comprises means operatively coupled to a media storage system for monitoring a state of the storage medium, determining a physical media type for the storage medium, determining a recorded type for the storage medium, and selecting a file system type for the storage medium if the storage medium is formatted using a file system. The media storage system is operable to interface with a storage medium. The system also comprises means operatively coupled to the media storage system for automatically readying the storage medium in response to the determinations and selection.

BRIEF DESCRIPTION OF THE DRAWINGS

For a more complete understanding of the present invention and the advantages thereof, reference is now made to the following descriptions taken in connection with the accompanying drawings and which:

FIG. 1 is a block diagram of an embodiment of an automatic media readying system utilizing teachings of the present invention;

FIG. 2 is an example of a method that may be used in an automatic media readying system utilizing teachings of the present invention.

DETAILED DESCRIPTION OF THE DRAWINGS

Figure 3:
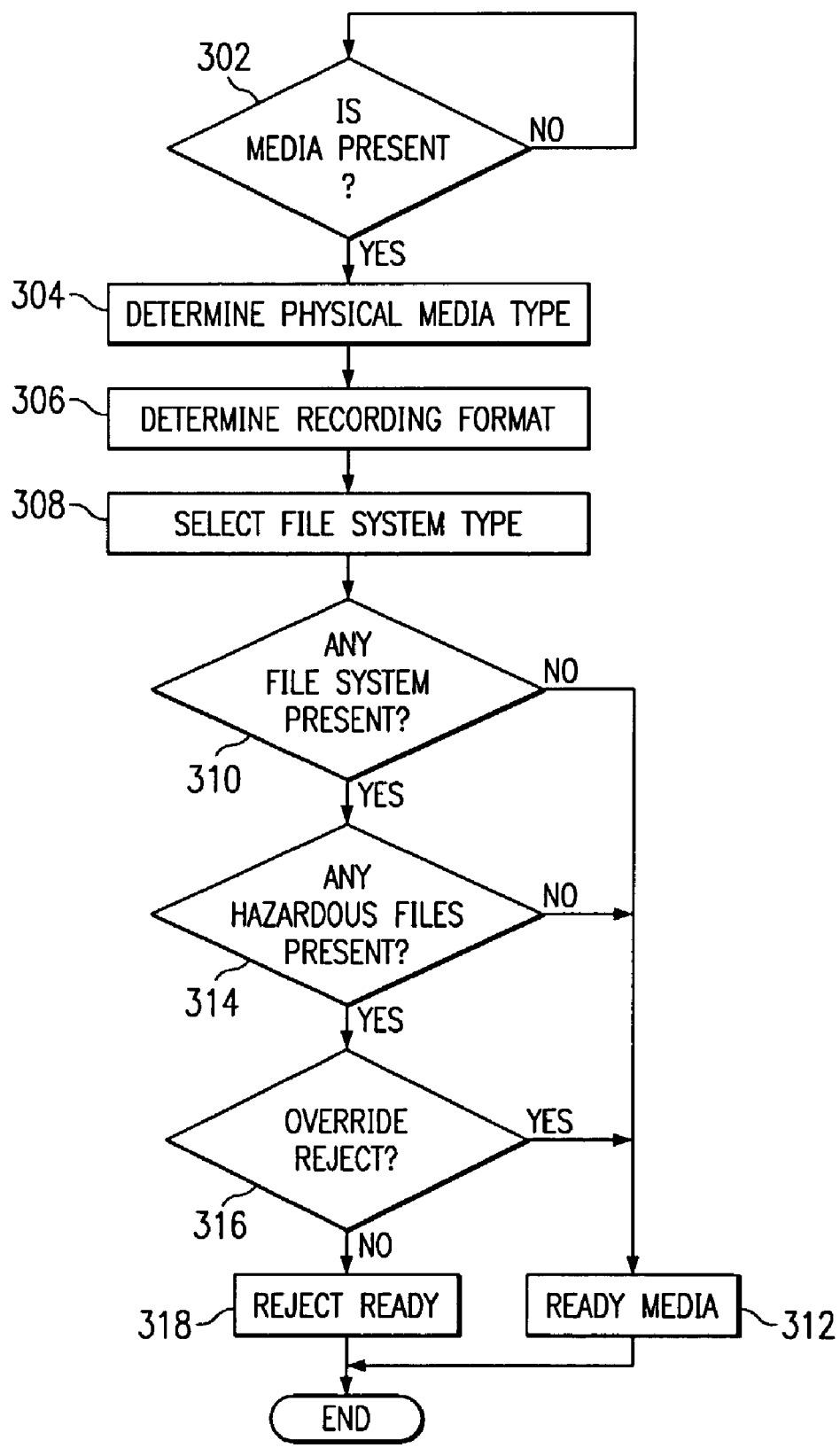
FIG. 3 is another example of a method that may be used in an automatic media readying system utilizing teachings of the present invention.

From the foregoing, it may be appreciated that a need has arisen for providing a method for automatically readying media. In accordance with the present invention, an automatic media readying system and method are provided that substantially reduce or eliminate the disadvantages of conventional systems and methods.

FIG. 1 is a block diagram of an embodiment of an automatic media readying system utilizing teachings of the present of the present invention. In the embodiment illustrated in FIG. 1, system 10 comprises an appliance 12 and a media storage system 30. One advantage of the present invention is that the invention provides for determining appropriate readying parameters and for automatically readying media on system 10. As one example, the teachings of the present invention are particularly useful in readying a Compact Disc (CD) after determining that there are no rogue programs on the disc that may be launched after the disc is readied on appliance 12. That is, the present invention provides for readying the disc for data on the disc to be accessed by appliance 12, such as where a disc has no file system, as is the case with music CDs. Where the disc has one or more file systems, embodiments of the present invention ready the disc by selecting the file system to be used and by readying the media. The present invention enables a user to determine whether one or more file systems reside on the disc and, accordingly, obviates the need for a user to manually enter data such as the type of media, the type of file systems, or recorded format before utilizing the CD. Although the present invention contemplates automatic readying of a variety of media such as, but not limited to, CDs, Digital Versatile Discs (DVDs), and other suitable optical media now known or later developed, this description utilizes the term "CD" as but one example to illustrate embodiments of the system and method.

Appliance 12 may be a network appliance or general-purpose programmable computer, such as the ubiquitous personal computer (PC), which is well-known in the art and readily available. Alternatively, appliance 12 may be a more task-specific or custom-designed processing system that may be specifically configured to interface with various devices and to perform in accordance with the methods described herein. One example of a network appliance is a digital entertainment center operable to process a plurality of media types, including music. In this scenario, audio files such as .MP3 or .WAV files may be played utilizing appliance 12 as a jukebox with an application such as a .MP3 player or REALPLAYER, available from RealNetworks, Inc. Appliance 12 may also be a wireless device, such as a cellphone or personal digital assistant. The present invention contemplates a variety of other representative configurations now known or that may be developed in the future.

To further illustrate, a network appliance such as a digital entertainment center includes a single user entry point 40 or interface, and is operable to process a plurality of media types, including music, "books on tape," lectures, etc. Thus, if appliance 12 is a digital entertainment center, a user entry point 40 enables a consumer-user to perform functions such as, for example, automatically tracking and digitally recording selected music files, and to pause, rewind and instantly replay music programs much like a VCR records and plays back video cassettes. A user entry point 40 may be a GUI with functions such as those described above, or such as those presented with a word processing program such as Word, available from Microsoft Corporation. A user entry point 40 does not enable the consumer-user to access, change, or move files, beyond the extent permitted by the dedicated functions in user entry point 40.

Appliance 12 may be one of a variety of appliances now known or developed in the future. For example, appliance 12 may be an appliance substantially similar to a VCR whose dedicated function is to enable a user to, for example, play, rewind and record video cassettes. The invention contemplates the development of new technologies that encompass traditional household appliances such as, but not limited to, ranges, refrigerators, televisions, and others, whether or not they include a substantial amount of electronic circuitry or logic, such as a stereo. These appliances may be operated by a user through a user entry point 40.

Appliance 12 comprises logic 14 operable to automatically ready a CD inserted into media storage system 30 according to a method such as the one discussed in further detail in conjunction with FIG. 2. Alternatively, logic 14 may be software, firmware, or hardware, and may reside in media storage system 30. As one example, in the embodiment shown in FIG. 1, logic 14 is a readying daemon process that may access and/or include programs or software resident on appliance 12 and is connected to, or include, a memory system, such as a cache or random access memory (RAM), suitable for storing all or a portion of these programs or routines and/or temporarily storing audio, video, text, or other data during various processes performed by readying daemon 14. The software code or routines may be implemented using a variety methods including, but not limited to, object-oriented methods, and using a variety of languages and protocols. In other embodiments, these applications may include software or firmware that includes procedures or functions and, in some embodiments, may be user-programmable as desired, depending on the implementation. Alternatively, or in addition, readying daemon 14 may also include, or be coupled to, logic that may be implemented in a variety of hardware and/or firmware configurations, including general circuitry or special-purpose digital circuitry which may be, for example, application-specific integrated circuitry (ASIC), state machines, fuzzy logic, etc.

Appliance 12 may be coupled using a variety of interfaces, for example, a motherboard, to a variety of elements such as media storage system 30 suitable for reading and/or storing data. For example, in the embodiment illustrated in FIG. 1, appliance 12 is coupled to media storage system 30 via any suitable interface, although the currently preferred interface is an integrated device electronics/advanced technology attachment packet interface (IDE/ATAPI) bus. Media storage system 30 can access data on a CD (not explicitly shown), and may couple with, and receive from and transfer data to, readying daemon 14. Media storage system 30 may also read, write, and play a variety of media such as CDs. After readying, the formatted data stored on the optical medium may then be viewed as desired using any playback device such as a REALONE player available from RealNetworks, Inc. or a DVD-ROM drive (neither is explicitly shown). Any suitable media storage system 30 now known or that may be developed in the future may be utilized according to teachings of the present invention.

Media such as CDs may be formatted today using a variety of current standards. CDs are formatted in many cases independent of their physical media type which, as but three examples, include stamped CDs, CD-R, and CD-RW. Each CD is one of many recording types, such as Yellow Book, and includes data formatted in one or more file systems. Compact Disc Digital Audio (CDDA) is a recording type that enables a user to extract digital samples from audio CDs, Moving Picture Experts Group (MPEG) streams from other video CDs, and XA frames from yet other types of CDs. Yellow Book is another recording type for CDs to be used for information storage for the physical format of CD-ROM. As another example, ISO 9660 is one international file system standard for formatting a CD Read-Only Memory (CD-ROM). Another file system standard is the Universal Data Format (UDF), which may be used with, for example, DVD-ROM to store data such as MPEG audio and video streams. UDF may also be used by CD-R and CD-RW recorders to efficiently and quickly write to a CD. One example of such a system is DirectCD, available from Adaptec, Inc., which uses a UDF version 1.5 file system.

File systems are readable by compatible operating systems (OSs), and implement the organization and structure of directories and files in the OS, in some systems termed a "file allocation table". For example, a CD-ROM using the International Organization for Standardization (ISO) 9660 standard has platform-independent files that can, in principle, be read on all operating systems compatible with that format. Those operating systems that do not support extensions or variations may not read variations of ISO 9660 filenames. Generally, a file system's media driver, such as a floppy drive, hard drive, disk partition, logical drive, or RAM drive, is readied to make a file system available for access. Readying may be performed at any suitable location understood by that OS. For example, in a UNIX OS, a file system is associated with a pathname location directory as a mount point. In UNIX, file systems are usually mounted either at boot time under control of /etc/rc (or one of its subfiles) or on demand by a readying daemon. As another example, other OSs such as VMS and DOS mount file systems as separate directory hierarchies.

CD-ROM volume and file structures have been defined in the ISO 9660 standard, whose extensions and variations, as well as other volumes and file structures, are all contemplated by the present invention. One example is the CD-ROM Extension, MSCDEX available from Microsoft Corp. OS variations include Hierarchical File Structure (HFS), Rock Ridge, a UNIX file system, and others.

While the embodiment illustrated in FIG. 1 and described herein is used to automatically ready media such as CDs and DVDs, other storage media currently known in the art or that may be developed in the future may also be used. In addition, although Universal Disc Format (UDF), ISO 9660, CDDA, and Yellow Book are described here in some detail, other file systems and recording types, and physical media types may also be used. Thus, the method and system of the present invention should not be limited to the particular storage media, recording types, file systems, and physical media types that are shown and described herein.

FIGS. 2 and 3 are examples of methods that may be used in an automatic media readying system utilizing teachings of the present invention. Generally, these methods monitor aspects associated with a media so that the media may be automatically mounted while minimizing manual intervention. Various embodiments may utilize fewer or more steps, and the methods may be performed using a number of different implementations, depending on the application.

FIG. 2 is an example of a method that may be used in an automatic media readying system utilizing teachings of the present invention. In step 202, the method may continually monitor whether media is present. If no media is present, the method continues to monitor whether media is present in step 202. If media is present, the method continues to step 204, where daemon 14 determines a physical media type for the media. The method then continues to step 206, to determine a recording format for the media, then to step 208, to determine a file system type for the media. The present invention contemplates performing steps 204, 206, and 208 in any order, and for a variety of file system types, physical media types, and formats now known or developed in the future.

In steps 204, 206, and 208, a variety of determinations may be made, depending on the implementation. For example, today, many conventional systems and methods write dual file systems that include UDF and ISO 9660. As one example, this scenario arises when a CD-RW is written on a first machine using UDF, but closed out using ISO 9660. In this scenario, in step 208, daemon 14 selects a file system for the storage medium, and the selected file system will be used to properly read the CD, even though a dual-file system was present. More generally, this step includes selecting a file system for the storage medium if the storage medium is formatted using a file system. This step includes determining whether one or more is file systems is present because, as previously discussed, in cases such as where the storage medium is a data CD, the storage medium may not even include a single file system.

Although a variety of methods may be used to determine which type of format, physical media, or recording format is present, in one embodiment, daemon 14 may search through a CD setup sector for a signature that indicates a file system type of either ISO 9660 or UDF. Because these protocols specify that such signatures be placed in particular locations, daemon 14 may utilize the file system layout to determine whether the file system type is ISO 9660, UDF, or both. In another scenario, daemon 14 might search through the file system to determine whether a majority of files are consistent with ISO 9660, UDF, or both. Moreover, as another example, daemon 14 may search through the track format of a CD in a table of contents. Where the table of contents includes an audio track, which is typically uncompressed raw data, the recording format is usually CDDA. The present invention contemplates a number of methods that may be used to automatically determine the information in steps 204, 206, and 208, including searching through various CD sectors for particular data types, signature, and file extensions.

The method then continues to step 210, where the method assesses whether a file system is present. In a preferred embodiment, this step may be performed in conjunction with step 208; however, step 210 may also, in some applications, be performed before step 208. No file system is present with today's data CDs. If a file system is not present, in step 212, the media is readied and readily accessible by appliance 12, and the method ends. If, on the other hand, a file system is present, the method proceeds to step 214, where the method determines whether hazardous files are present. As one example, hazardous files may be unexpected file types having size or other characteristics that do not appear to be consistent with the majority of data expected on a CD. Thus, a large ".gif" file may be considered a hazardous file when detected among the .mp3 or .wav files expected on a music or other data CD. If no hazardous files are present, in step 212 the media is mounted using the selected file system to be readily accessible by appliance 12, and the method ends. If, in step 214, hazardous files are present a reject condition is detected, the method proceeds to step 216, where it rejects the readying of the media. The method then ends. The method also contemplates, if applicable, sending a notification to a desired recipient such as an administrator or other user that the media has been readied. Such a notification may be useful for, among other things, larger networks where mass storage may be used.

The present invention also contemplates a number of reject conditions as well as hazardous files. As one example, many rogue programs are written on a CD-RW with a suffix ending in ".exe". In this example, the method may detect a reject condition where a file "autorun.exe" is found on a CD that is inconsistent with such an executable—as one example, a data CD. In this scenario, the "autorun.exe" file is detected as a hazardous file, because it may be a rogue program, such as a virus that may self-launch. In this scenario, a reject condition may be detected if a user desires not to ready the media because of the presence of the hazardous file. On the other hand, an "autorun.exe" file would not be unexpected for an Install CD where such a program is expected to be launched to install an application.

FIG. 3 is another example of a method that may be used in an automatic media readying system utilizing teachings of the present invention. As illustrated, this method is identical up to step 314, where the method determines whether hazardous files are present. If no hazardous files are present, in step 212 the media is mounted using the selected file system to be readily accessible by appliance 12, and the method ends. If, in step 314, hazardous files are present a reject condition is detected, the method proceeds to step 316, where a user determines whether to override the reject condition and to ready the media. For example, a user may decide to override the reject condition where the user is making a backup data CD. In such a scenario, the user may not consider a large ".gif" file to be a hazardous file when detected among the .doc, .mp3, and .wav files on her data CD. If the user decides in step 316 to override the reject condition, the method proceeds to step 312, where the media is readied. The method then ends. If, on the other hand, the user decides in step 316 to not override the reject condition, the method proceeds to step 318, where the media is rejected. The method then ends. This method also contemplates, if applicable, sending a notification to a desired recipient such as an administrator or other user that the media has been readied. Such a notification may be useful for, among other things, larger networks where mass storage may be used.

What is claimed is:

1. A method for automatically readying a medium, comprising:
   determining a physical media type for a storage medium using readying logic;
   determining a type of data stored on the storage medium using the readying logic;
   selecting, using the readying logic, a file system type for the data stored on the storage medium if the storage medium is formatted using a file system; and
   automatically readying the storage medium for reading data stored thereon in response to the determinations and selection.

2. The method of claim 1, further comprising selecting the physical media type from the group consisting of a compact disc (CD) that has been stamped, CD-R, and CD-RW.

3. The method of claim 1, further comprising determining whether, if any file systems are present, hazardous files are resident on the storage medium.

4. The method of claim 1, further comprising rejecting readying of the storage medium if a reject condition is detected.

5. The method of claim 1, further comprising selecting the file system in response to data most likely to be used.

6. The method of claim 1, further comprising selecting the file system type from the group consisting of Compact Disc Digital Audio (CDDA), International Organization for Standardization (ISO) 9660, and Universal Disk Format (UDF).

7. The method of claim 1, further comprising determining the type of data from the group consisting of CDDA and Yellow Book.

8. A system for automatically readying a medium, comprising:
   a media storage system operable to interface with a storage medium;
   an appliance communicatively coupled to the media storage system; and
   application logic operatively associated with the appliance and operable to:
     determine a physical media type for the storage medium;
     determine a type of data stored on the storage medium;
     select a file system type for the data stored on the storage medium if the storage medium is formatted using a file system; and
     automatically ready the storage medium for reading data stored thereon in response to the determinations and selection.

9. The system of claim 8, wherein the physical media type is selected from the group consisting of a compact disc (CD) that has been stamped, CD-R, and CD-RW.

10. The system of claim 8, wherein the logic is further operable to determine whether, if any file systems are present, hazardous files are resident on the storage medium.

11. The system of claim 8, wherein the logic is further operable to reject readying of the storage medium if a reject condition is detected.

12. The system of claim 8, wherein the logic is further operable to send notification information that the storage medium has been readied.

13. The system of claim 8, wherein the file system type is selected from the group consisting of Compact Disc Digital Audio (CDDA), International Organization for Standardization (ISO) 9660, and Universal Disk Format (UDF).

14. The system of claim 8, wherein the type of data is determined from the group consisting of CDDA and Yellow Book.

15. An automatic media readying application, comprising:
    a computer-readable storage medium; and
    an automatic readying application resident on the computer-readable storage medium and operable to:
      determine a physical media type for the storage medium;
      determine a type of data stored on the storage medium;
      select a file system type for the data stored on the storage medium if the storage medium is formatted using a file system; and
      automatically ready the storage medium for reading data stored thereon in response to the determinations and selection.

16. The application of claim 15, wherein the physical media type is selected from the group consisting of a compact disc (CD) that has been stamped, CD-R, and CD-RW.

17. The application of claim 15, wherein the readying application is further operable to determine whether, if any file systems are present, hazardous files are resident on the storage medium.

18. The application of claim 15, wherein the readying application is further operable to reject readying of the storage medium if a reject condition is detected.

19. The application of claim 15, wherein the file system type is selected from the group consisting of Compact Disc Digital Audio (CDDA), International Organization for Standardization (ISO) 9660, and Universal Disk Format (UDF).

20. The application of claim 15, wherein the type of data is selected from the group consisting of CDDA and Yellow Book.

21. A system for automatically readying a medium, comprising:
    means operatively coupled to a media storage system for determining a physical media type for a storage medium, determining a type of data stored on the storage medium, and selecting a file system type for the data stored on the storage medium if the storage medium is formatted using a file system; and means operatively coupled to the media storage system for automatically readying the storage medium for reading data stored thereon in response to the determinations and selection; and wherein the media storage system is operable to interface with a storage medium.

22. The system of claim 21, wherein the physical media type is selected from the group consisting of a compact disc (CD) that has been stamped, CD-R, and CD-RW.

23. The system of claim 21, wherein the logic is further operable to determine whether, if any file systems are present, hazardous files are resident on the storage medium.

24. The system of claim 21, wherein the logic is further operable to reject readying of the storage medium if a reject condition is detected.

* * * * *